United States Patent [19]

Kimijima et al.

[11] Patent Number: 4,536,615

[45] Date of Patent: Aug. 20, 1985

[54] KEY TELEPHONE EQUIPMENT AND ASSOCIATED METHOD

[75] Inventors: Norio Kimijima, Nagatsuta; Yuzuru Kawazoe, Kawasaki, both of Japan

[73] Assignee: Nitsuko Limited, Kawasaki, Japan

[21] Appl. No.: 455,264

[22] Filed: Jan. 3, 1983

[30] Foreign Application Priority Data

Jun. 5, 1982 [JP] Japan ................................ 57-95605

[51] Int. Cl.³ .......................... H04M 1/60; H04M 9/06
[52] U.S. Cl. .............................. 179/81 B; 179/18 AD; 179/99 A
[58] Field of Search ............ 179/18 AD, 18 U, 81 B, 179/99 A, 99 M, 100 L, 99 P, 99 R

[56] References Cited

U.S. PATENT DOCUMENTS

| | | | |
|---|---|---|---|
| 4,184,054 | 1/1980 | Shibata et al. | 179/99 M |
| 4,203,011 | 5/1980 | Coviello | 179/99 M |
| 4,254,306 | 3/1981 | Sekiguchi et al. | 179/99 R |
| 4,347,409 | 8/1982 | Ogawa et al. | 179/99 R X |

FOREIGN PATENT DOCUMENTS

| | | | |
|---|---|---|---|
| 52-48441 | 12/1977 | Japan . | |
| 53-119606 | 10/1978 | Japan | 179/99 M |
| 54-127609 | 10/1979 | Japan | 179/99 R |

Primary Examiner—Keith E. George

Attorney, Agent, or Firm—Roberts, Spiecens & Cohen

[57] ABSTRACT

Telephone apparatus including a main unit and a plurality of loudspeaker type key telephone sets, in which a pair of office line call wires to be used solely for an office line call, a pair of audio signal wires to be used for calling and talking with a loudspeaker and a pair of data wires to be used for time-sharing transmission of control data extend from the main unit. The respective loudspeaker key telephone sets all connect in parallel to these three pairs of wires. A neutral potential point of the audio signal wire pair and a neutral potential point of the data wire pair are coupled, on the main unit side, to a D.C. power supply via a D.C. network and to loudspeaker drive systems connected to the audio signal wire pair via an A.C. network. The neutral potential points on the button-switch telephone set side connect to a D.C. constant voltage circuit in each telephone set via a D.C. network and to a talking network in the telephone set via a transfer switch. Thereby the connecting path employing the audio signal wire pair as one conductor and the data wire pair as the other conductor can be used for supplying D.C. electric power to the respective telephone sets and for effecting an extension line call whereby the number of wires connecting the respective telephone sets to the main unit can be minimized to six.

17 Claims, 5 Drawing Figures

KEY TELEPHONE EQUIPMENT AND ASSOCIATED METHOD

FIELD OF THE INVENTION

The present invention relates to key telephone equipment and associated methods, and more particularly, to a key telephone system making use of loudspeaker key telephone sets, in which the number of connecting wires between a main unit and the key telephone sets is minimized.

PRIOR ART

Heretofore, the aforementioned type of key telephone equipment has been conveniently used as a means for enabling a number of extension line telephone sets to use a common circuit of an office line. However, in such key telephone equipment it was necessary to use a large number of connecting wires for connecting the main unit to the respective key telephone sets.

As one solution for eliminating this shortcoming, it was proposed to use a control wire in common by every telephone set by carrying out transmission of a control signal with time-shared pulse signals, as disclosed in Japanese Patent Publication No. 52-48441. However, even in this improved system, a power supply line extending from a power supply to each telephone set was required. Moreover, in the case where a loudspeaker telephone set is used for each key telephone set, an audio signal line must be provided separately, and hence the number of connecting wires was further increased.

SUMMARY OF THE INVENTION

It is therefore one object of the present invention to provide key telephone equipment and associated methods in which the number of wires connecting a main unit to respective key telephone sets is minimized.

A more specific object of the present invention is to provide key telephone equipment and associated methods in which loudspeaker key telephone sets are used as extension line telephone sets and yet only 6 wires for one circuit of an office line suffice for connecting a main unit to the respective extension line telephone sets and provide every function normally required for such type of telephone equipment.

According to one feature of the present invention, there is provided improved key telephone equipment including a main unit and a plurality of loudspeaker key telephone sets, in which a pair of office line call wires used solely for an office line call, a pair of audio signal wires used for calling and talking with a loudspeaker and a pair of data wires used for time-sharing transmission of control data extend from the main unit. The respective loudspeaker key telephone sets are all connected in parallel to these three pairs of wires. A neutral potential point of the audio signal wire pair and a neutral potential point of the data wire pair are coupled, on the main unit side, to a D.C. power supply via a D.C. network and to loudspeaker drive means connected to the audio signal wire pair via an A.C. network and, on the key telephone set side, to a power supply circuit in each telephone set via a D.C. network and to a talking network in each telephone set via a transfer switch.

In the key telephone equipment according to the present invention, due to the above-featured construction with only three pairs of wires (6 wires connecting the main unit to the respective telephone sets), besides an office line call, loudspeaker call and control data transmission, D.C. power supply from the main unit to the respective telephone sets and extension line calls can be achieved.

The above-mentioned and other objects, features, and advantages of the present invention will become more apparent by reference to the following description of preferred embodiments of the invention taken in conjunction with the accompanying drawings.

BRIEF DESCRIPTION OF THE DRAWINGS IN THE ACCOMPANYING DRAWINGS:

FIG. 2($a$) shows the format of a transmission signal to be used for data transmission between the main unit and the telephone sets shown in FIG. 1;

FIG. 2($b$) shows a pulse waveform of the same transmission signal on the data wires;

DESCRIPTION OF THE PREFERRED EMBODIMENTS

Figure 1:
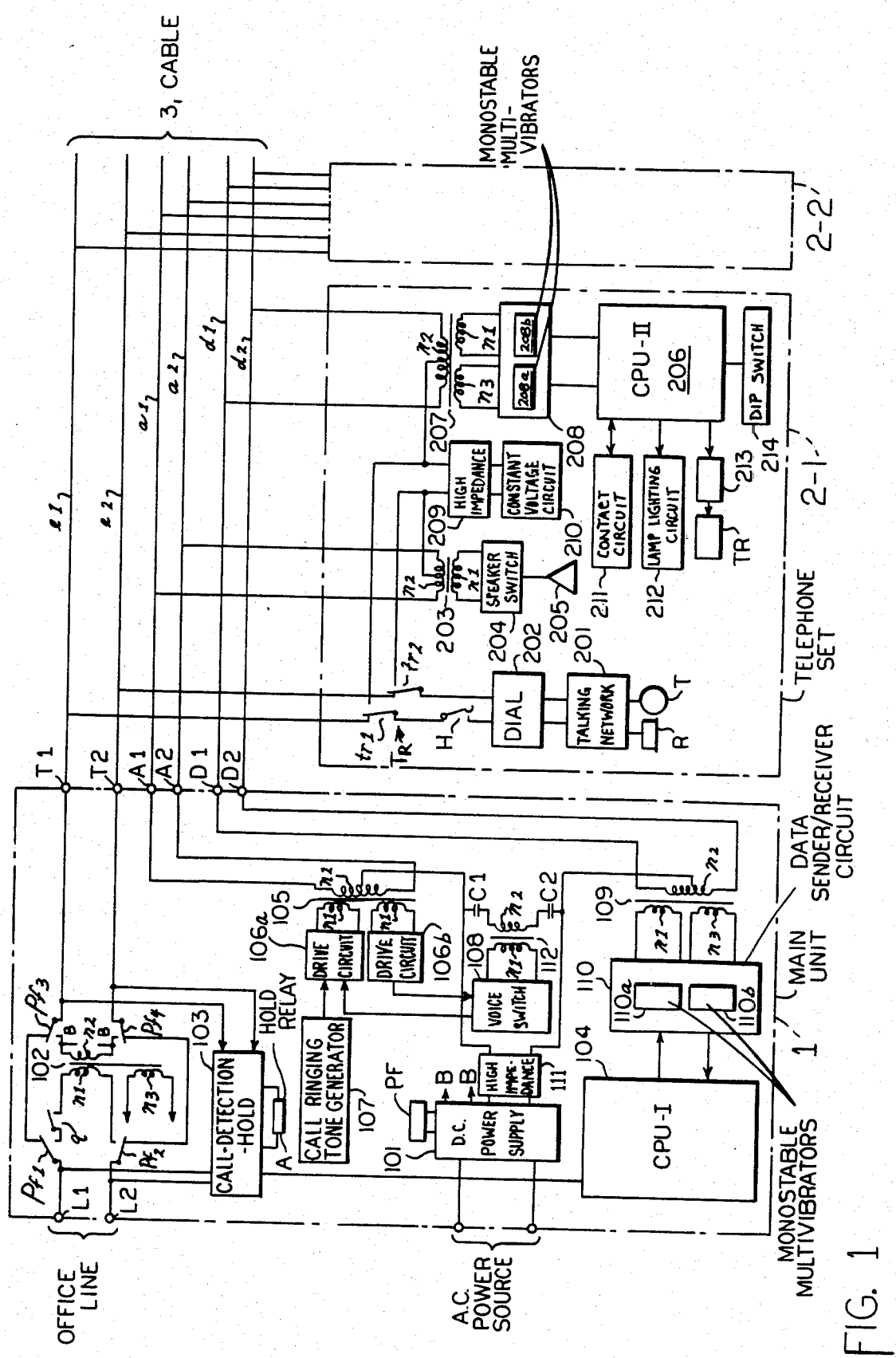
FIG. 1 is a block circuit diagram showing a construction of a main unit and telephone sets in one preferred embodiment of the present invention.

Referring now to FIG. 1, the illustrated embodiment comprises a main unit 1 connected to an office line and an A.C. power source, a plurality of key telephone sets (hereinafter called simply "telephone sets") 2-1, 2-2 . . . , 2-N (only two of them being illustrated) and a 6-wire cable 3 connecting the main unit 1 to the plurality of telephone sets 2-1, 2-2, etc. It is to be noted that all the telephone sets are connected in parallel to the 6-wire cable 3 as shown in FIG. 1. In other words, the 6-wire cable 3 is used in common for connecting each telephone set to the main unit, and accordingly the respective telephone sets are also connected to each other through the same 6-wire cable.

In the 6-wire cable 3, two wires $l_1$ and $l_2$ are used as office line call wires, two other wires $a_1$ and $a_2$ are used as audio signal wires, and the remaining two wires $d_1$ and $d_2$ are used as data wires. In addition, the two pairs of wires $a_1$ and $a_2$ and $d_1$ and $d_2$ are also jointly used to form an extension call line and a power supply line as will be described later. It is to be noted further that in place of the 6-wire cable 3, other multi-wire cables or a plurality of single-wire cables could be employed.

Construction of the Main Unit:

The main unit 1 includes a D.C. power supply circuit 101 connected to an external A.C. power source such as a commercial A.C. power line for feeding D.C. power to respective portions of the telephone equipment, and an office line circuit. It is to be noted that connecting lines between the D.C. power supply circuit 101 and the respective portions of the telephone equipment are omitted from the illustration for simplicity of the drawings, except for those necessary for explanation of the drawings.

The office line circuit is a circuit for making connection between office line connection terminals $L_1$ and $L_2$ and connection terminals $T_1$ and $T_2$ for office line call wires $l_1$ and $l_2$, and it includes a voice-frequency transformer 102 having a primary winding $n_1$ connected between the office line terminals $L_1$ and $L_2$ via make-side transfer contacts $pf_1$ and $pf_2$ of a so-called transfer relay PF for making direct connection to the office line call wires $l_1$ and $l_2$ upon electric power failure and make contacts a of an office line hold or seizure relay as will be described later. The secondary winding $n_2$ of the voice-frequency transformer 102 is connected between the terminals $T_1$ and $T_2$ via make-side transfer contacts $pf_3$ and $pf_4$ of the transfer relay PF. The voice-frequency transformer 102 is further provided with a tertiary winding $n_3$, and this winding is connected via a gate (not shown) to a hold tone source (not shown) for generating a hold tone to be transmitted to the office line upon holding the office line.

The transfer relay PF is connected to the D.C. power supply circuit 101 such that it may be operated when the external A.C. power source is in service but it may be released upon power failure. Its break-side transfer contacts $pf_1$ and $pf_3$ are directly connected to each other, and its break-side transfer contacts $pf_2$ and $pf_4$ are also directly connected to each other. Accordingly, upon electric power failure (the state shown in FIG. 1), the office line is directly connected to the office line call wires $l_1$ and $l_2$. FIG. 1 shows the restored state of the relay contacts, that is, the state upon electric power failure.

The office line circuit further includes a terminating call detection/hold circuit 103 connected to the office line terminals $L_1$ and $L_2$. The terminating call detection/hold circuit 103 detects a ringing tone signal incoming through the office line and transmits a terminating call detection signal to a main control circuit (hereinafter abbreviated as CPU-I) 104 such as a microprocessor as will be described later. The terminating call detection/hold circuit 103 has an office line hold or seizure relay A connected thereto, and in response to a hold instruction signal sent from the CPU-I 104 it actuates this office line seizure relay A to establish an office line hold state. The terminating call detection/hold circuit 103 is also connected to the terminals $T_1$ and $T_2$ for the office line call wires $l_1$ and $l_2$, and as long as a current is flowing through the office line call wires $l_1$ and $l_2$ it continuously maintains the office line seizure relay A in an actuated state. Accordingly, if a talking network of the telephone set 2-1 or 2-2 is connected to the office line call wires $l_1$ and $l_2$, a current flows from terminals B-B of the power supply circuit 101 through these office line call wires $l_1$ and $l_2$, hence the office line seizure relay A is actuated, and thereby the office line can be held. Thereafter, when dial pulses appear on the office line call wires $l_1$ and $l_2$, the office line seizure relay A successively repeats the operation and releases in response to the dial pulses, and thus the dial pulses are transmitted through the office line. Audio signals sent through the office line and also sent from the talking network in the telephone set are transmitted to the office line call wires and the office line, respectively, through the voice-frequency transformer 102.

Connection terminals $A_1$ and $A_2$ for the audio signal wires $a_1$ and $a_2$ are connected to the secondary winding $n_2$ of the voice-frequency transformer 105, and its primary winding $n_1$ and tertiary winding $n_3$ are connected to drive circuits 106a and 106b, respectively. The drive circuit 106a amplifies a tone signal generated from a terminating call ringing tone generator 107 and transmits the tone signal to the audio signal wires $a_1$ and $a_2$ via the primary winding $n_1$ and secondary winding $n_2$ of the voice-frequency transformer 105. The drive circuit 106a is also connected to a voice switch 108 to amplify an audio signal fed from the voice switch 108 and transmit it to the audio signal wires $a_1$ and $a_2$ via the primary winding $n_1$ and secondary winding $n_2$ of the voice-frequency transformer 105. The other drive circuits 106b amplifies an audio signal fed from the tertiary winding $n_3$ and transmits it to the voice switch 108. The drive circuits 106a and 106b and the voice switch 108 jointly form a call transfer circuit and an extension line circuit. It is to be noted that the terminating call ringing tone generator 107 is actuated by a control signal sent from the CPU-I 104 upon a terminating call.

Terminals $D_1$ and $D_2$ for connection with the data wires $d_1$ and $d_2$ are connected to the secondary winding $n_2$ of a pulse transformer 109, and its primary winding $n_1$ and tertiary winding $n_3$ are connected to a data sender/receiver circuit 110. The data sender/receiver circuit 110 transmits a data signal fed from the CPU-I 104 to the data wires $d_1$ and $d_2$ via the primary winding $n_1$ and secondary winding $n_2$ of the pulse transformer 109. In addition, the data sender/receiver circuit 110 receives a data signal transmitted from the telephone set 2-1 or 2-2 through the data wires $d_1$ and $d_2$, via the secondary winding $n_2$ and tertiary winding $n_3$ of the pulse transformer 109, and applies the received data signal to the CPU-I 104.

The D.C. power supply circuit 101 produces a D.C. power source voltage for use in the telephone sets, and the D.C. voltage output terminals of the D.C. power supply circuit 101 are connected via a high impedance circuit 111 to a center tap of the secondary winding $n_2$ of the voice-frequency transformer 105 and a center tap of the secondary winding $n_2$ of the pulse transformer 109. Accordingly, the D.C. power source voltage for use in the telephone sets is supplied to the respective telephone sets via the audio signal wires $a_1$ and $a_2$ and also via the data wires $d_1$ and $d_2$.

In addition, between the center tap of the secondary winding $n_2$ of the voice-frequency transformer 105 and the center tap of the secondary winding $n_2$ of the pulse transformer 109 is connected a secondary winding $n_2$ of another voice-frequency transformer 112 via D.C. blocking capacitors $C_1$ and $C_2$, and the primary winding $n_1$ of the voice-frequency transformer 112 is connected to the voice switch 108. Accordingly, an audio signal transmitted through a transmission path which employs the audio signal wires $a_1$ and $a_2$ as one conductor and the data wires $d_1$ and $d_2$ as the other conductor, is applied to the voice switch 108 via the voice-frequency transformer 112. This audio signal is transmitted to the audio signal wires $a_1$ and $a_2$ through the drive circuit 106a and the voice-frequency transformer 105 as described previously. The above-mentioned audio signal path of $a_1$-$a_2$-$d_1$-$d_2$→112→108→106a→105→$a_1$-$a_2$ forms a voice calling circuit upon call transfer and an extension line call, as will be described later. As a matter of course, transmission of an audio signal in the opposite direction can be effected through a similar audio signal path of $a_1$-$a_2$→105→106b→108→112→$a_1$-$a_2$-$d_1$-$d_2$.

Construction of the Telephone Set:

Since telephone sets 2-1, 2-2, ..., 2-N all have the same construction, the construction will be illustrated and described here with respect to the telephone set 2-1 only.

The telephone set has a talking network 201 to which a transmitter T and a receiver R are connected, and the talking network 201 is connected to office line call wires $l_1$ and $l_2$, through a dial signal generator circuit 202 which can be either a dial impulse generator circuit or a push-button dial signal sender circuit, a hook switch H and break-side transfer contacts $tr_1$ and $tr_2$ of a transfer relay TR for switching between an extension line call and an office line call.

To the audio signal wires $a_1$ and $a_2$ is connected a secondary winding $n_2$ of a voice-frequency transformer 203, whose primary winding $n_1$ is connected through a loudspeaker switch circuit 204 to a loudspeaker (serving also as a microphone) 205. Accordingly, when an audio signal is transmitted from the main unit 1 to the audio signal wires $a_1$ and $a_2$, if the loudspeaker switch circuit 204 is in an on state, the loudspeaker 205 is driven to generate a sound. In addition, the loudspeaker 205 also operates as a microphone, so that it converts input sound into an electrical signal and transmits it to the audio signal wires $a_1$ and $a_2$. It is to be noted that the loudspeaker switch circuit 204 is controlled by a control circuit 206 (hereinafter abbreviated as CPU-II) such as, for example, a microprocessor or the like as will be described later, and when the corresponding telephone set is called, the speaker switch circuit 204 is turned on.

The data wires $d_1$ and $d_2$ are connected to a secondary winding $n_2$ of a pulse transformer 207, whose primary winding $n_1$ and tertiary winding $n_3$ are connected to a data sender/receiver circuit 208. The data sender/receiver circuit 208 transmits a data signal fed from the CPU-II 206 via the primary winding $n_1$ and secondary winding $n_2$ of the pulse transformer 207 to the data wires $d_1$ and $d_2$, and, it also receives a data signal transmitted from the main unit 1 through the data wires $d_1$ and $d_2$ via the secondary winding $n_2$ and tertiary winding $n_3$ of the pulse transformer 207, and supplies the data signal to the CPU-II 206. Between a center tap of the secondary winding $n_2$ of the voice-frequency transformer 203 and a center tap of the secondary winding $n_2$ of the pulse transformer 207 is connected a constant voltage circuit or a voltage regulator 210 via a high impedance circuit 209.

In the main unit 1, as described previously, D.C. electric power for use in each telephone set is fed from the center taps of the voice-frequency transformer 105 and the pulse transformer 109 through the audio signal wire pair $a_1$-$a_2$ and the data wire pair $d_1$-$d_2$. Accordingly, the constant voltage circuit 210 can produce constant D.C. voltage electric power to be fed to the respective portion of the same telephone set from the D.C. electric power fed from the main unit, and it can provide output of constant D.C. voltage electric power. In other words, since the respective telephone sets can be supplied with D.C. electric power from the main unit 1 by making use of the audio signal wire pair $a_1$-$a_2$ and the data wire pair $d_1$-$d_2$, there is no need to separately provide a power supply line.

It is to be noted that for simplicity of illustration, power supply lines extending from the constant voltage circuit 210 to the respective portions within the same telephone set are omitted from the drawing.

The center tap of the secondary winding $n_2$ of the voice-frequency transformer 203 and the center tap of the secondary winding $n_2$ of the pulse transformer 207 are connected through make-side transfer contacts $tr_1$ and $tr_2$ of the transfer relay TR, the hook switch H and the dial signal generator circuit 202 to the talking network 201.

Accordingly, when the tranfer relay TR is in its operated condition, the talking network 201 can transmit an audio signal through an audio signal path consisting of the audio signal wire pair $a_1$-$a_2$ serving as one conductor and the data wire pair $d_1$-$d_2$ serving as the other conductor. It can receive an audio signal through the same audio signal path. Therefore, upon an extension line call or call transfer, in the case of calling the telephone set 2-2 from the telephone set 2-1, in the telephone set 2-1 if the transfer relay TR is operated by depressing a corresponding key switch and a caller talks to the party telephone set 2-2 through the transmitter T, then the audio voice signal is transmitted through the above-mentioned audio signal path $a_1$-$a_2$-$d_1$-$d_2$. The signal then passes through the voice-frequency transformer 112, voice switch 108, drive circuit 106a and voice-frequency transformer 105 in the main unit 1. The signal is further transmitted through the audio signal wires $a_1$ and $a_2$. This transmitted audio signal drives the loudspeaker 205 in the telephone set 2-2. That is, calling of an extension line by voice can be achieved. At the same time, since an audio signal can be transmitted in the opposite direction through a similar transmission path including loudspeaker drive circuit 106b instead of the drive circuit 106a, talking can be achieved mutually between the telephone set 2-1 and the telephone set 2-2. Under this condition, while the former is using the transmitter T and the receiver R and the latter is using the loudspeaker 205.

If the transfer relays TR are operated in both the telephone sets 2-1 and 2-2, then the talking networks 201 in the respective telephone sets 2-1 and 2-2 are connected to each other through the audio signal wire pair $a_1$-$a_2$ and the data wire pair $d_1$-$d_2$, so that an extension line call employing the transmitter T and the receiver R on each side can be completed between the telephone sets 2-1 and 2-2. It is to be noted that in this case in the main unit 1 the voice switch 108 is disconnected under the control of the CPU-I 104, as will be described later.

A contact circuit 211 of key switches for various control purposes such as, for example, an office line selection switch, an extension line selection switch, a hold switch, etc., is connected to the CPU-II 206, so that information corresponding to a depressed key switch is processed as data in the CPU-II 206 and is transmitted through the data wires $d_1$ and $d_2$.

A lamp lighting circuit 212 responds to a control signal sent from the CPU-II 206 either to illuminate or put out a corresponding light (or a light emitting diode).

A transfer relay control circuit 213 controls the operation of the transfer relay TR in response to a control signal sent from the CPU-II 206. The transfer relay TR is normally maintained in an operated condition and is released upon an office line call.

A dip switch 214 is connected to the CPU-II 206 and serves to preset an extension line number of the corresponding telephone set.

Functions of CPU-I and CPU-II:

The CPU-I 104 responds to a terminating call detection signal sent from the terminating call detection/hold circuit 103 and various signals sent from the telephone sets 2-1, 2-2, . . . , 2-N via the data sender/receiver circuit 110 for generating respective predetermined control signals.

On the other hand, the CPU-II 206 responds to control signals sent from the main unit 1 and received via the data sender/receiver circuit 208 for controlling respective elements in the telephone set, and it also supervises the key switch contact circuit 211 to transmit a signal corresponding to an actuated key switch to the main unit 1 via the data sender/receiver circuit 208.

As a most basic construction, here it is assumed that from the main unit 1 to the telephone sets are sent an office line indicator lamp signal, a hold indicator lamp signal, a loudspeaker switch control signal and a transfer relay TR release signal, and from the telephone sets to the main unit 1 are sent an off-hook signal indicating that a handset provided with the transmitter T and the receiver R has been lifted, a hold instruction signal indicating actuation of a hold key switch, an office line selection signal indicating actuation of an office line selection key switch and an extension line number signal generated by an extension line select operation.

Hereinafter will be described the functions of controlling the processing of an office line originating call, the processing of a terminating call, the establishment of an office line call state, the processing of office line hold, the processing of call transfer and the establishment of an extension line call state.

O: Processing of an Office Line Originating Call

If a handset is lifted up and an office line selection key switch is actuated at any one of the telephone sets, then the CPU-II 206 in that telephone set transmits an off-hook signal and an office line selection signal to the main unit 1. When the CPU-I 104 has received these signals, it transmits a release signal for the transfer relay TR to the originating telephone set and an office line indicator lamp signal to all the telephone sets. When the CPU-II of the originating telephone set has received the release signal, it releases the transfer relay TR. Hence the talking network 201 is connected to the office line call wires $l_1$ and $l_2$ via the break-side transfer contacts $tr_1$ and $tr_2$ of the transfer relay TR. On the other hand, since the CPU-II's of all the telephone sets receive the office line indicator lamp signal, they control the associated lamp lighting circuits 212 to illuminate the office line indicator lamps.

Subsequently, if dialing is effected at the originating telephone set, an originating call through an office line is processed at an exchange office.

A: Processing of a Terminating Call

When the CPU-I 104 has received a terminating call detection signal from the terminating call detection/hold circuit 103, it actuates the terminating call ringing tone generator 107 to transmit a terminating call ringing tone signal to the audio signal wires $a_1$ and $a_2$ via the drive circuit 106a. At the same time, it generates an office line indicator lamp signal and a loudspeaker switch control signal.

When the CPU-II's of the respective telephone sets have received the office line indicator lamp signal and the loudspeaker switch control signal, they actuate the associated lamp lighting circuits 212 to illuminate the respective office line indicator lamps, and also switch on the associated loudspeaker switches 204. In this way, indication of a terminating call is effected at each telephone set by illumination of the office line indicator lamp and by a sound signal from the loudspeaker 205 of the terminating call ringing tone sent through the audio signal wires $a_1$ and $a_2$.—[TERMINATING CALL STATE]

It is to be noted that if the CPU-I 104 is programmed in such a manner that the transmission of the office line indicator lamp signal and the loudspeaker switch control signal is interrupted at a predetermined cycle as will be described later, then the office line indicator lamp in each telephone set will flash at a predetermined rate (for instance, at a rate of about 1 Hz) and the ringing tone generated from the loudspeaker 205 will become an intermittent ringing tone (for instance, one second of ringing and three seconds of pause).

B: Operation of Establishing an Office Line Call State

When the CPU-I 104 has received an off-hook signal and an office line selection signal from any one of the telephone sets, depending upon which one of the terminating call states as described above, a hold state and a call transfer hold state as will be described later is the present state, the CPU-I 104 establishes an office line call state through one of the following operations (1), (2), and (3), and in the case of the other states it does not respond to the received signals:

(1) In the case of receiving the signals in the terminating call state:

If these signals are received under the above-mentioned terminating call state, the CPU-I 104 first stops the operation of the terminating call ringing tone generator 107. In addition, it cancels the loudspeaker control signal sent to all the telephone sets, but maintains generation of the office line indicator lamp signal sent to all telephone sets, and further generates a release signal for the transfer relay TR to be sent to the responding telephone set.

In each telephone set, since the CPU-II 206 continues to receive the office line indicator lamp signal, the lamp lighting circuit 212 is kept operated, but since the loudspeaker switch control signal is not received, the CPU-II 206 turns off the loudspeaker switch circuit 204. On the other hand, in the responding telephone set, since a release signal for the transfer relay TR is received, the CPU-II 206 releases the transfer relay TR.

In this way, an office indicator lamp is lighted to indicate that the office line is busy in every telephone set. On the other hand, in the responding telephone set, since its talking network 201 is connected to the office line call wires $l_1$ and $l_2$ through the break-side transfer contacts $tr_1$ and $tr_2$ of the transfer relay TR, the telephone set is brought to the office line call state.—[TRANSFER TO OFFICE LINE CALL STATE I]

It is to be noted that in order to discriminate whether a signal transmitted from the main unit is addressed to all the telephone sets or to one particular telephone set, it is only necessary to transmit the signal jointly with the extension line number of the addressed telephone set. In this connection, description will be made later with reference to FIGS. 2 and 3.

(2) In the case of receiving the signals in a hold state:

If these signals are received in a hold state, then the CPU-I 104 cancels a hold instruction signal which has been sent so far to the terminating call detection/hold circuit 103, on the other hand generates a release signal for a transfer relay TR to be sent to the responding telephone set, and also cancels a hold indicator lamp signal which has been sent so far to all the telephone sets.

In response to the above-mentioned operation of the CPU-I 104, in each telephone set, since the hold indicator lamp signal is not received, the CPU-II 206 controls the corresponding lamp lighting circuit 212 so as to extinguish the hold indicator lamp in that telephone set. On the other hand, in the responding telephone set, the CPU-II 206 not only extinguishes the hold indicator lamp, but also releases the transfer relay TR in response to the TR relay release signal.

Accordingly, the talking network 201 in the responding telephone set is connected to the office line call wires $l_1$ and $l_2$ through the hook switch contacts H and the break-side transfer contacts $tr_1$ and $tr_2$ of the transfer TR. Thus, the responding telephone set is brought to the office line call state. [TRANSFER TO OFFICE LINE CALL STATE II]

(3) In the case of receiving signals in a call transfer hold state:

When the CPU-I 104 has received these signals from the telephone set addressed for call transfer or even from another telephone set in a call transfer state, similarly to the above-described case (2) the CPU-I 104 effects cancellation of a hold instruction signal which has been sent so far to the terminating call detection/hold circuit 103 and transmission of a release signal for a transfer relay TR to the responding telephone set, and it also stops operation of the voice switch 108.

In the responding telephone set, since a release signal for the transfer relay TR is received, the CPU-II therein releases the transfer relay TR.

In this way, the talking network 201 in the responding telephone set is connected to the office line call wires $l_1$ and $l_2$ through the hook switch contacts H and the break-side transfer contacts $tr_1$ and $tr_2$ of the transfer relay TR. Thus, the responding telephone set is brought into the office line call state. [TRANSFER TO OFFICE LINE CALL STATE III]

C: Processing for Office Line Hold

When the CPU-I 104 has received a hold instruction signal, if the signal is that transmitted from the telephone set which is then talking through the office line, it carries out the following operations. However, if the signal is that transmitted from another telephone set, the CPU-I 104 does not respond thereto.

When the hold instruction signal has been received, the CPU-I 104 sends a hold instruction to the terminating call detection/hold circuit 103 to hold the operation of the office line seizure relay A, and also causes a hold tone to be transmitted from a hold tone source (not shown) to the office line through the tertiary winding $n_3$ and primary winding $n_1$ of the voice-frequency transformer 102. On the other hand, the CPU-I 104 cancels the release signal for the transfer relay TR in the telephone set which transmitted the hold instruction signal and generates a hold indicator lamp signal to be sent to all the telephone sets.

In response to the above-mentioned operations of the CPU-I 104, in every telephone set, since the hold indicator lamp signal is received, the CPU-II 206 controls the lamp lighting circuit 212 to light a hold indicator lamp. In addition, in the telephone set which transmitted the hold instruction signal, as the TR relay release signal disappears, the CPU-II 206 operates the transfer relay TR. Accordingly, the talking network 201 in that telephone set is disconnected from the office line call wires $l_1$ and $l_2$. Thus an office line hold state is established. [TRANSFER TO HOLD STATE]

D: Operation for Extension-Line Calling

The operation is commenced in response to transmission of an off-hook signal and a called extension line number from any one of the telephone sets.

When the CPU-I 104 has received a called extension line number and the off-hook signal, it operates the voice switch 108 and also transmits a loudspeaker switch control signal for the called telephone set. At the same time, the CPU-I 104 carries out either one of the following different operations (1) and (2) depending upon whether or not the telephone set on the calling extension line is in an office line call state:

(1) In the case where the calling telephone set is in an office line call state:

In this case, the CPU-I 104 sends a hold instruction signal to the terminating call detection/hold circuit 103, and at the same time cancels the release signal for the transfer relay TR in the calling telephone set.

In response to the above-mentioned operations, in the calling telephone set since the release signal for the transfer relay TR disappears, the CPU-II 206 in that telephone set operates the transfer relay TR to disconnect the talking network 201 from the office line call wires $l_1$ and $l_2$. On the other hand, in the called telephone set, since the CPU-II 206 receives the loudspeaker switch control signal, it turns on the loudspeaker switch circuit 204.

Accordingly, while the office line is held and supplied with a hold tone signal, the calling telephone set and the called telephone set are connected to each other through an audio signal path consisting of the talking network 201 of the calling telephone set—the secondary windings $n_2$ of the transformers 203 and 207—the audio signal wire pair $a_1 a_2$ and the data wire pair $d_1 d_2$—the seconary windings $n_2$ of the transformers 105 and 109—the transformer 112—the voice switch 108—the drive circuits 106a and 106b—the transformer 105—the audio signal wires $a_1$ and $a_2$—the transformer 203 of the called telephone set—the loudspeaker switch circuit 204—the loudspeaker 205. Accordingly, in response to calling by a human voice from the calling telephone set, the calling voice is heard from the loudspeaker of the called telephone set. Then, conversation can be effected between both telephone sets. [TRANSFER TO HOLD STATE]

It is to be noted that if necessary, at this moment the hold indicator lamp signal could be transmitted intermittently from the CPU-I 104 to the called telephone set to intermittently flash the hold indicator lamp and thereby effect visual indication of extension line calling. In addition, the hold indicator lamp signal could be also transmitted to the other telephone sets intermittently at a different cycle to indicate the fact that certain other telephone sets are in an extension line calling state or in a call transfer state.

Alternatively, modification could be made such that the CPU-I 104 operates the terminating call ringing tone generator 107 for a predetermined period to produce a ringing tone sound at the loudspeaker 205 of the called telephone set.

(2) In the case where the calling telephone set is not in an office line call state:

In this case, the CPU-I 104 operates the terminating call ringing tone generator 107 for a predetermined period of time.

In the called telephone set, since the CPU-II 206 receives the loudspeaker switch control signal, it turns on the loudspeaker switch circuit 204.

Accordingly, in a similar manner to the above-described case, the calling telephone set and the called telephone set are connected to each through the audio signal path consisting of the talking network 201 of the calling telephone set—the secondary windings $n_2$ of the transformers 203 and 207—the audio signal wire pair $a_1 a_2$ and the data wire pair $d_1 d_2$—the secondary windings $n_2$ of the transformers 105 and 109—the transformer 112—the voice switch 108—the drive circuits 106a and 106b—the transformer 105—the audio signal wires $a_1$ and $a_2$—the transformer 203 of the called telephone set—the loudspeaker switch circuit 204—the loudspeaker 205. Accordingly, in response to calling from the calling telephone set, a ringing tone emanates from the loudspeaker 205 of the called telephone set for a predetermined period of time, and the voice of the caller also emanates from the loudspeaker 205 of the called telephone set. Then, conversation can be effected between both telephone sets. [TRANSFER TO EXTENSION LINE CALLING STATE]

In this case also, as described previously, the CPU-I 104 could transmit the hold indicator lamp signal intermittently to indicate at the called telephone set or at every telephone set that extension line calling is in effect.

E: Processing for Establishment of an Extension Line Call State

In the above-mentioned call transfer hold state or extension line calling state, if an off-hook signal transmitted from the called telephone set is receiving by the CPU-I 104, then the CPU-I 104 turns off the voice switch 108 and cancels the loudspeaker switch control signal for the called telephone set. In response thereto, the loudspeaker switch circuit 204 in the called telephone set is turned off.

In this condition, an extension line call is completed between the calling telephone set and the called telephone set through an audio signal path consisting of the talking network 201 of the calling telephone set—the hook switch H—make-side transfer contacts $tr_1$ and $tr_2$ of the transfer relay TR—the secondary windings $n_2$ of the transformers 203 and 207—the audio signal wire pair $a_1 a_2$ and the data wire pair $d_1 d_2$—the secondary windings $n_2$ of the transformers 203 and 207 of the called telephone set—the make-side transfer contacts $tr_1$ and $tr_2$ of the transfer relay TR—the hook switch H—the talking circuit 201 of the called telephone set. [EXTENSION LINE CALL STATE]

It is to be noted that in the case where the called telephone set is talking through the office line, an off-hook signal transmitted from the talking telephone set is present in the CPU-I 104, and therefore, the processing does not transfer to the extension line call state.

F: Processing for Clearing

If an on-hook signal is fed to the CPU-I 104 from a telephone set which has transmitted so far an off-hook signal, the CPU-I cancels all the operation signals which have been sent so far to that telephone set except for the control signals which are necessitated due to the existence of another off-hook telephone set (for instance, an office line indicator lamp signal, a hold indicator lamp signal, etc), and likewise cancels all the control signals sent to the internal portions of the main unit 1.

Accordingly, in the case where all the telephone sets are in the on-hook state, the key telephone equipment is entirely restored to its initial state except for the cases of the office line standby state, the hold state and the call transfer hold state.

Data/Transmission/Reception System:

Since the main unit 1 and the plurality of telephone sets 2-1, 2-2, . . . , 2-N are transmitting and receiving data through a pair of common data wires $d_1$ and $d_2$, a data transmission/reception system is necessary in which data signals carried on the data wires can be identified as regards which telephone set they pertain.

In the following, a data transmission/reception system accoring to one preferred embodiment will be described with reference to FIGS. 2(a), 2(b) and 3.

Figures 2A, 2B, 3:
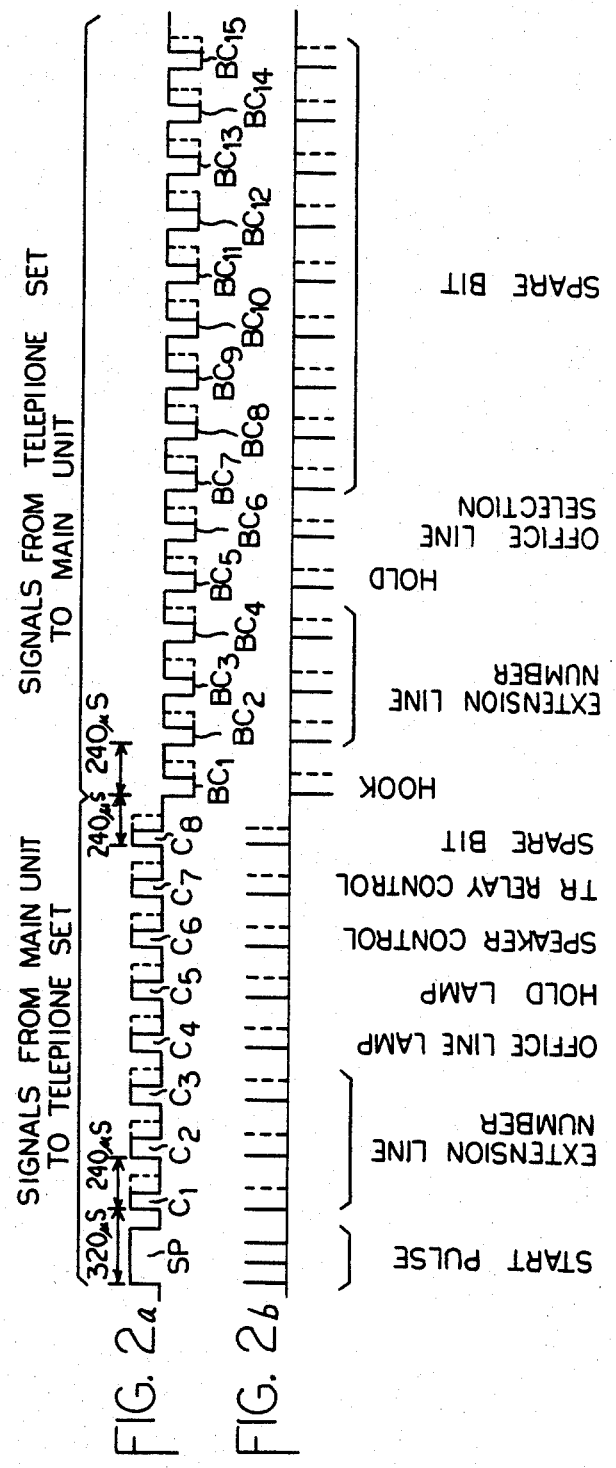
FIG. 3 is a time chart showing one example of a timing program for time-sharing data transmission between the main unit and the telephone sets.

In the CPU-I 104 of the main unit 1, a start pulse SP having a predetermined pulse duration (in the illustrated example, 240 μs) is produced, and a predetermined period (in the illustrated example, 80 μs) after the start impulse SP, synchronizing pulses $C_1, C_2, \ldots, C_8$ having a predetermined pulse duration (80 μs) for indicating bit positions where respective data pulses are to be inserted are transmitted at a predetermined repetition period (240 μs) as shown in FIG. 2(a) by means of clock generated by a clock circuit therein. The number of the synchronizing pulses can be determined depending upon the number of bits included in the entire data to be transmitted, and in order to make it possible to add data information, the number could be selected so as to include spare bits. In the illustrated example, 8 bits are chosen. The three bits subsequent to the start bit SP are used for designating the positions of binary codes of an extension line number, the fourth synchronizing pulse $C_4$ is used for designating the bit insert position for an office line indicator lamp signal, the fifth synchronizing pulse $C_5$ is used for designating the bit insert position for a hold indicator lamp signal, the sixth synchronizing pulse $C_6$ is used for designating the bit insert position for a loudspeaker switch control signal, the seventh synchronizing signal $C_7$ is used for designating the bit insert position for a transfer relay control signal, and the eighth synchronizing pulse $C_8$ is used, in the illustrated example, for designating the position where a spare bit is to be inserted, the spare bit being available when it is desired to insert additional control information.

The CPU-I 104 forms a set of information signals by inserting control signals to be transmitted into the corresponding bit positions and setting binary codes of an extension line number in the first three bit positions as shown by dash lines in FIG. 2(a), and transmits these information signals to the data wires $d_1$ and $d_2$ via the data sender/receiver circuit 110.

Here, it is to be noted that the data sender/receiver circuit 110 is provided with a mono-stable multivibrator 110a to convert the high-level pulses of 80 μs in pulse width into high-level pulses of 1 μs in pulse width. A pulse waveform after the conversion is illustrated in FIG. 2(b). When a pulse of 240 μs in pulse width, sch as the start pulse SP, is transmitted from the CPU-I 104, three (240/80=3) 1 μs pulses are transmitted every 80 μs therefrom, and, for example, when an office line indicator lamp signal is inserted, a pulse of 80×2=160 μs in pulse width joined with the synchronizing pulse $C_4$ appears, and hence two (160/80=2) 1 μs pulses are transmitted with a repetition period of 80 μs to the data wires $d_1$ and $d_2$. In every telephone set 2-1, 2-2, . . . , 2-N, the pulses of 1 μs in pulse width transmitted from the main unit 1 and received by the data sender/receiver circuit 208 are converted into pulses of 80 μs in pulse width by means of a mono-stable multivibrator 208a (80 μs operation) (that is, converted into a pulse signal train similar to that shown in FIG. 2(a)), and they are applied to the CPU-II 206. Accordingly, the CPU-II 206 can determine whether the signal being transmitted currently from the main unit 1 is addressed to its own telephone set or to another telephone set on the basis of the binary codes associated with the extension line number code designating synchronizing pulses $C_1$-$C_3$. If the codes represent its own extension line number, then the CPU-II 206 sends control signals to respective portions of the telephone set in accordance with the control signals inserted in the subsequent bit positions designated for the respective control signals.

Data transmission signals sent from every telephone set to the main unit 1 are constructed in a similar manner by making use of negative pulses. More particularly, as shown in the right side portion of the FIG. 2(a), a clock pulse $BC_1$ for designating the bit position of a signal indicating off-hook or on-hook, three clock pulses $BC_2$, $BC_3$ and $BC_4$ for designating the bit positions of binary codes of an extension line number of a called telephone set upon extension line calling, clock pulses $BC_5$ and $BC_6$ for designating the bit positions of instruction signals corresponding to key switches at the calling telephone set (for instance, a hold instruction signal corresponding to a hold key, an office line selection signal corresponding to an office line selection key, etc.) and additional clock pulses (in the illustrated example $BC_7$–$BC_{15}$) for designating the bit positions of control signals to be used additionally according to necessity, would appear every 240 μs with a pulse duration of 80 μs, and the respective data signals would be inserted subsequently to the corresponding pulses as signal pulses of 80 μs in pulse width as shown by dash lines in FIG. 2(a).

A series of these transmission signals are transmitted from the CPU-II 206 through the data sender/receiver circuit 208 to the data wires $d_1$ and $d_2$, and in this case the 8 μs low level pulses are converted into 1 μs low level pulses by means of a mono-stable multivibrator 208b to form a pulse train as shown in the right side portion of FIG. 2(b). In the main unit 1, when the signals transmitted from the telephone sets are received by the data sender/receiver circuit 110, the pulses of 1 μs in pulse width are converted into pulses of 80 μs in pulse width by means of mono-stable multivibrator 110b, and then they are applied to the CPU-I 104.

Since the data to be transmitted from the main unit 1 are represented by positive pulses, while the data to be transmitted from the telephone sets are represented by negative pulses, and thus the respective data pulses are made to have different polarities from each other, the pulse signals on the data wires $d_1$ and $d_2$ can be easily identified whether they are signals being transmitted from the main unit 1 to the telephone set 2 or signals being transmitted from the telephone set 2 to the main unit 1.

In order to prevent data signals transmitted from a plurality of telephone sets to the main unit from coexisting on the data wires $d_1$ and $d_2$, and in order to save the number of bits for designating extension line numbers of the respective telephone sets themselves, in the illustrated embodiment, provision is made such that transmission of data signals from each telephone set may be carried out immediately after that telephone set has received data signals from the main unit with a time interval of 80 μs retained therebetween. In other words, with regard to the same telephone set, the transmission signals from the main unit 1 to the telephone set 2 continue to the transmission signals from the telephone set 2 to the main unit 1, as shown in FIG. 2.

More particularly, as shown in FIG. 3, the CPU-I 104 in the main unit 1 carries out data transmission and reception sequentially with the respective telephone sets with a time interval of 80 μs reserved therebetween according to a predetermined program, and after the data transmission and reception with all the telephone sets have finished, a pause time of data transmission and reception is reserved, and thereafter the next data transmission and reception are commenced. The sum of the time for data transmission and reception with all the telephone sets and the subsequent pause time, that is, one repetition period is chosen to be 80 ms in the illustrated example. Since the time required for data transmission and reception is 25 ms (in the case of 6 telephone sets in total), a period of 45 ms is reserved as the pause time of data transmission and reception. During these pause periods, in the CPU-1 104 and the CPU-II 206 are respectively effected processing for transmitting control signals to various portions on the basis of the received data and for producing data signals to be transmitted subsequently by supervising the states of the various portions.

Operation of the Telephone Equipment:

When the A.C. power source is switched on, D.C. electric power is fed from the D.C. power supply circuit 101 to respective portions of the main unit 1, and at the same time, D.C. electric power is fed to the respective telephone sets 2-1, 2-2, . . . , 2-N through the audio signal wire pair $a_1$-$a_2$ and the data wire pair $d_1$-$d_2$ as described previously. Thereby, the CPU-I and the CPU-II's operate to set the respective portions within the main unit 1 and within the respective telephone sets at their initial states. Here, it is to be noted that within the telephone sets 2-1, 2-2, . . . , 2-N, the transfer relays TR are set in their operative states. In other words, the transfer contacts $tr_1$ and $tr_2$ of the transfer relays TR are transferred too their make sides, in contrast with the illustrated states.

In the main unit 1, the transfer relay PF is operated by the output of the D.C. power supply circuit 101, and hence its transfer contacts $pf_1$–$pf_4$ are transferred to make sides, in contrast with their illustrated states. In addition, D.C. electric power for talking is fed from the B-B terminals of the D.C. power supply circuit 101 to the office line call wires $l_1$ and $l_2$.

When a predetermined period of time that is necessary and sufficient for setting the initial states of the respectively portions has elapsed after the switching on of the power source, the CPU-I commences data transmission and reception to and from the respective telephone sets in the sequence described previously with reference to FIGS. 2(a), 2(b), and 3, and repeatedly interrupts the data transmission and reception at the above-described repetition period. Under this condition, except for the fact that in the data signals transmitted from the main unit 1 the codes indicating the extension line numbers of the respective telephone sets are present at the corresponding bit positions, signal pulses are not present at all the other bit positions. Accordingly, the respective portions in the main unit 1 and the respective telephone sets are still maintained at their initial states.

Upon interruption of the A.C. power source, that is, upon electric power failure, the transfer relay PF is released, and thus the office line terminals $L_1$ and $L_2$ are directly connected to the office line call wires $l_1$ and $l_2$ via the breake-side transfer contacts $pf_1$–$pf_4$ of the transfer relay PF. In addition, since the transfer relay TR in each telephone set is also released, if a handset is lifted at any one of the telephone sets, the talking network 201 in that telephone set is directly connected to the office line simultaneously with switching on of its hook switch H. Accordingly, even upon electric power failure, both a terminating call and an originating call through the office line can be achieved by any one of the telephone sets.

Now, in the A.C. power source condition, an originating call through the officeline originated from any one of the telephone sets is effected by the operations described in Section O above. MorO particularly, when a handset has been lifted and an offset line selection key has been depressed at any arbitrary telephone set, the talking network 201 of that telephone set is connected to the office line call wires $l_1$ and $l_2$. As a result, talking current flows from the B—B terminals of the D.C. power supply circuit 101 through the office line call wires $l_1$ and $l_2$ and the talking network 201. Thereby the terminating call detection/hold circuit 103 is operated and actuates the office line seizure relay A, so that the office line is held through its make contacts a. Then, if dialing is carried out at that telephone set, in the case where the dial signal is a multi-frequency or tone signal, the dial signal is transmitted via the voice-frequency transformer 102 to the office line, whereas in the case where the dial signal consists of dial impulses, the relay A repeats its operation and release in response to the dail impulses, and thus, it contacts a repeat break and make operations. In other words, the dial impulses can be transmitted to the office line via the contacts a of the office line seizure relay A. In this way, an office line originating cell can be orginated.

Next, when an office line terminating call is present, the office line indicator lamps of the respective telephone sets are lighted or intermittently flashed and ringing tones are generated either continuously or intermittently from the loudspeakers of the respective telephone sets by the action of the CPU-I 104 of the main unit 1 and the CPU-II 206 of the respective telephone set 2, as described previously in Section A: Processing of a Terminating Call. That is, a terminating call has been established.

It is to be noted that the office line indicator lamp can be intermittently flashed and the ringing tone can be made to sound intermittently, by providing transmission cycles in which the office line indicator lamp signal and the loudspeaker control signal are not generated, instead of generating these signals in every transmission cycle. By this provision, the indication of a terminating call can be distinguished from the indication of a talking state where the office line indicator lamp is continuously lighted.

Under this terminating call state, if a handset is lifted and an office line selection key is depressed at any one of the telephone sets, for instance, at the telephone set 2-1, then an off-hook signal and an office line selection signal would appear at the corresponding bit positions in the subsequent transmission signal series from the telephone set 2-1 to the main unit 1. In response thereto, in the main unit 1 and in the respective telephone sets the operations in the case of the "Transfer to Office Line Call State I" as described above are carried out. Accordingly, in the telephone set 2-1, in response to the next transmission signal transmitted from the main unit 1, the talking network 201 is connected to the office line call wires $l_1$ and $l_2$. As a result, a talking current flows through the office line call wires $l_1$ and $l_2$, hence the seizure relay A operates and its contacts a are held in a make state, and therefore, conversation through the office line can be achieved via the voice-frequency transformer 102.

After termination of conversation, if the handset is hung on, the hook switch H is opened and hence the current flowing through the office line call wires is interrupted, so that the seizure relay A is released. As a result, the office line is disconnected. On the other hand, since an on-hook signal is transmitted from the telephone set 2-1 to the main unit 1, the CPU-I of the main unit 1 cancels the office line indicator lamp signals transmitted to all the telephone sets, and also cancels the release signal for the transfer relay TR transmitted to the telephone set 2-1. Consequently, the office line indicator lamps are extinguished at all the telephone sets, and in the telephone set 2-1 the transfer relay TR operates. Thus, the telephone equipment is again restored to its initial state.

At the telephone set 2-1, if a hold key is depressed during conversation instead of hanging on the telephone set, then a hold signal is transmitted from that telephone set to the main unit 1. Hence the CPU-I 104 in the main unit 1 and the CPU-II's in the respective telephone sets carry out the operations described previously in Section C: Processing for Office Line Hold, and the telephone equipment transfers to a hold state.

In this hold state, if a handset is lifted and an office line selection key is depressed at any one of the telephone sets, then an off-hook signal and an office line selection signal is transmitted from that telephone set to the main unit 1. Accordingly, as described previously in Section B, Paragraph (2) with respect to the case of Transfer to Office Line Call State II, the responding telephone set assumes an office line call state.

In addition, in the case where during conversation at the telephone set 2-1, it is desired to transfer the call to another telephone set, if the desired extension line number is designated at the telephone set 2-1 while holding the handset lifted, then a call transfer hold state is established as explained previously in Section D, Paragraph (1). In this state, if the handset if lifted at the called telephone set, then since an off-hook signal is transmitted to the main unit 1, an extension line call state can be established as explained previously in Section E.

After this call transfer hold state or the subsequent extension line call state has been established, if the handset is hung on at the telephone set which was talking through the office line, the extension line call with the called telephone set is cleared as a result of disconnection of the talking network 201 by switching-off of the hook switch H in the telephone set in which the handset was hung on.

On the other hand, if a handset is lifted and an office line selection key is depressed at the called telephone set or at another telephone set either before or after the handset is hung on at the telephone set which was talking through the office line, then in addition to an off-hook signal, an office line selection signal is transmitted from the responding telephone to the main unit. As a result, the operation of "Transfer to Office Line Call State III" is carried out as explained previously in Section B, Paragraph (3), and thereby the responding telephone set is brought into an office line call state.

With regard to an extension line call, if a handset is lifted and an extension line number of a called telephone set is designated by operation of keys at a calling telephone set, then an extension line calling state is established as explained previously in Section D, Paragraph (2). In this condition, an extension line call can be achieved between the handset of the calling telephone set and the loudspeaker of the called telephone set. Accordingly, even if the called telephone set is at an office line call state, it is possible to achieve the extension line call.

In the above-mentioned condition, when the called telephone set is not in an office line call state, if a handset is lifted at the called telephone set, an off-hook signal is transmitted from that telephone set to the main unit, and thereby an extension line call state can be established as explained previously in Section E. In other words, in that state the calling telephone set and the called telephone set are connected to permit talking via their respective handsets.

While description has been made above in connection with a preferred embodiment in a basic case in which office line call, extension line call, office line hold and office line call transfer are achieved, it is possible to achieve various other controls by making use of the spare bits in the above-described transmission signals between the main unit and the telephone sets or by increasing the number of bits in the transmission signals.

As described previously, in this telephone equipment, since the transfer relays TR are operated in all the telephone sets other than in an office line call state, all the other telephone sets are not connected to the office line call wires, and thus, the telephone equipment has a so-called secret talking function. However, if desired, it can be made possible for two telephone sets to simultaneously achieve an office line call by providing a secret talking release key in each telephone set and when this key is depressed, a secret talking release signal may be transmitted subsequently to the spare clock pulse $BC_7$ in FIG. 2(a), and when the CPU-I 104 in the main unit 1 has received an extension line number and the secret talking release signal from the telephone set at an office line call state, it may transmit a TR relay release signal to the telephone set of the received extension line number.

Furthermore, while a terminating call ringing tone is generated at every telephone set when a terminating call occurs in the above-described embodiment, if desired, modification can be made so as to make only a particular telephone set or particular telephone sets generate the terminating call ringing tone, by providing a terminating call ringing tone generation key in each telephone set to transmit a terminating call ringing tone generation instruction signal from the telephone set in which the terminating call ringing tone generation key is depressed at the pulse position subsequent to the spare clock pulse $BC_8$ in FIG. 2(a), and when a terminating call occurs, the CPU-I 104 in the main unit 1 transmits a loudspeaker switch control signal only to the telephone set or telephone sets which are transmitting this terminating call ringing tone generation instruction signal.

In addition, in the case where it is desired to enable each telephone set to establish an extension line calling rejection state, it is only necessary to provide in each telephone set an extension line calling rejection key so that when this key is depressed, an extension line calling rejection signal may be transmitted to the main unit at the pulse position subsequent to, for example, the clock pulse $BC_9$ in FIG. 2(a), and in the CPU-I 104 of the main unit 1, when an extension line call is effected to the telephone set which is transmitting the extension line calling rejection signal, a busy tone is transmitted (by making use of the terminating call ringing tone generator 107) to the calling telephone set instead of carrying out the "Processing for Extension Line Calling" as explained previously in Section D. More particularly, the output tone of the terminating call ringing tone generator 107 can be transmitted intermittently via the voice switch 108 and the transformer 112 and through the audio signal wire pair $a_1$-$a_2$ and the data wire pair $d_1$-$d_2$ to the calling telephone set.

Moreover, in the call transfer hold state or the extension line calling state as described previously in Section D, Paragraph (1) and Paragraph (2), if it is desired to prevent transmission of sound at the called telephone set from being transmitted to the calling person via the microphone of the loudspeaker 205 in the called telephone set, each telephone set may have the capability of preventing transmission of voice and sound to a calling telephone due to the microphone function of the loudspeaker 205 by operation at the called telephone set of a microphone-off key added to each telephone set. Then it is only necessary to provide a modification in which a signal representing operation of the microphone-off key is transmitted to the main unit 1 at the pulse position subsequent to, for example, the clock pulse $BC_{10}$ in FIG. 2(a), and when the CPU-I 104 has received this microphone-off key signal from the called telephone set, it controls the voice switch 108 to block the audio signal transmitted through the loudspeaker drive circuit 106b to the transformer 112.

Still further, in the case where it is required that any one telephone set can transmit an audio message to all the other telephone sets, it is only necessary to provide the modification that for an all telephone set calling mode (that is, "all call") a key is provided in each telephone set to transmit an all call signal at the pulse position subsequent to, for example, the clock pulse $BC_{11}$ in FIG. 2(a) when that key has been depressed, and when the CPU-I 104 has received this signal from any one telephone set, it turns on the voice switch 108 and also transmits a loudspeaker switch control signal to each of the other telephone sets.

In the heretofore known key telephone equipment, it has been common practice to provide a monitor box containing a microphone disposed at a desired location to make it possible to listen to sound received by the monitor box at any arbitrary telephone set when it is desired, or to provide a background music source to make it possible to listen to background music at an arbitrary telephone set by operating a key, or to provide an unlock device directly coupled to a door-phone to make it possible to unlock an electric lock of a door by operating a corresponding key at any arbitrary telephone set.

In the key telephone equipment according to the present invention, the same operations can be achieved by making use of the spare bits in the above-described transmission signals transmitted from the telephone set to the main unit or increasing the number of bits in the transmission signals, and by adding an additional program of the CPU-I 104.

Figure 4:
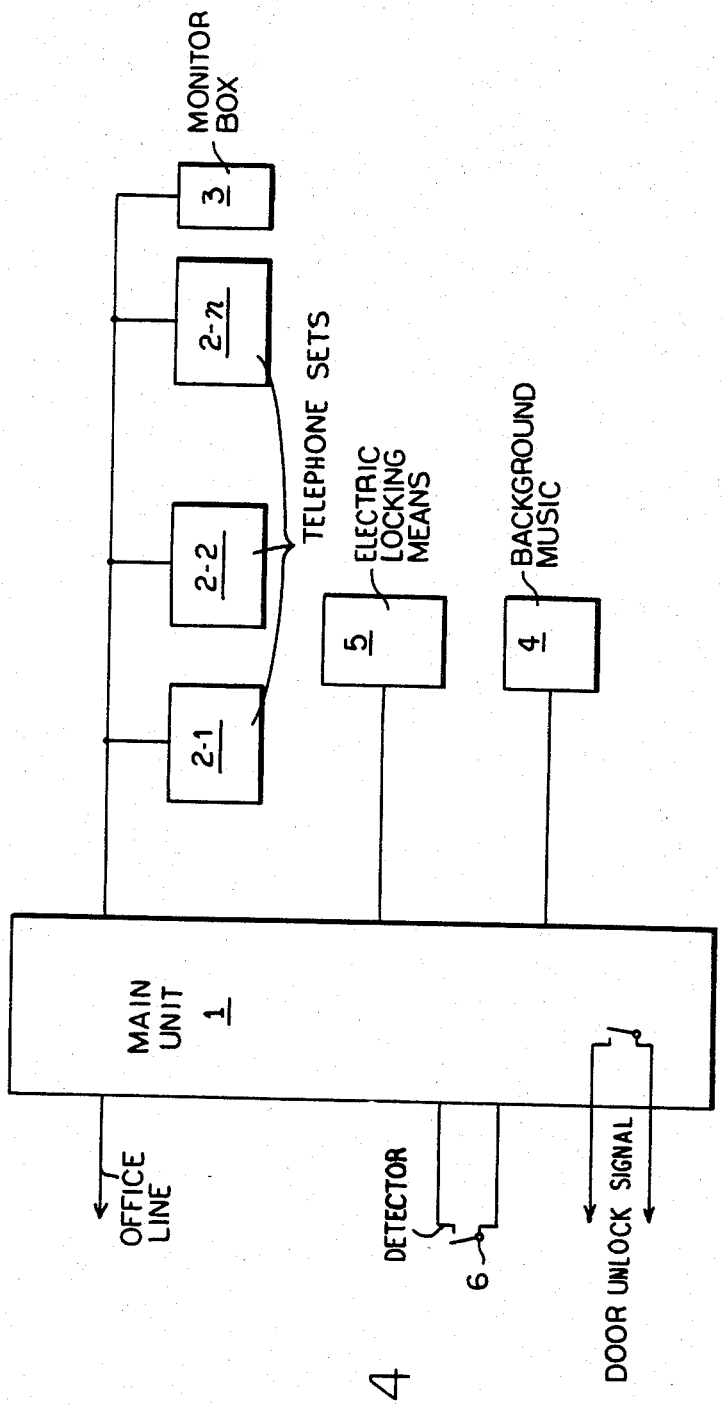
FIG. 4 is a block diagram showing the general construction of another preferred embodiment of the present invention.

FIG. 4 shows a block diagram of the telephone equipment according to the present invention in the case where the above-mentioned monitoring function, background music function and door unlock function are incorporated, together with means for generating a fire alarm or other alarm. Referring to FIG. 4, reference numeral 1 designates the above-described main unit and reference numerals 2-1, 2-2, . . . , 2-N designate key telephone sets. Reference numeral 3 designates a monitor box which is connected to the audio signal wires $a_1$ and $a_2$ and the data wires $d_1$ and $d_2$ and allotted an extension line number similar to the telephone sets 2-1, 2-2, . . . , 2-N. Moreover, the monitor box 3 includes a relay (hereinafter called M-relay) corresponding to the TR-relay in the telephone set, and when the M-relay is operated, an audio signal generated by a microphone is transmitted to the audio signal wires $a_1$ and $a_2$. Accordingly, if the CPU-I 104 in the main unit 1 is modified that when the extension line number of the monitor box 3 has been designated by any arbitrary telephone set, the CPU-I 104 may transmit the extension line number of the monitor box as well as an M-relay control signal located at the pulse position of the TR-relay release signal to the monitor box 3 and transmit a loudspeaker switch control signal for the calling telephone set, then the sound at the monitor box 3 is produced at the loudspeaker of the calling telephone set.

In addition, in a further modification when the all call key has been operated simultaneously with designation of the extension line number of the monitor box 3 at a calling telephone set, the CPU-I 104 may transmit not only the above-mentioned M-relay control signal and the loudspeaker switch control signal for the calling telephone set but also the loudspeaker switch control signals for all the telephone sets, then the sound at the monitor box 3 is produced at the loudspeakers of all the telephone sets.

In the case where the background music source 4 is connected to the telephone equipment and a button-switch for requesting this background music source 4 is provided in each telephone set, it is only necessary to provide the modification such that in each telephone set, a background music request signal (hereinafter abbreviated as BGM) produced by operation of a key-switch may be transmitted to the main unit 1 at the pulse position subsequent to the clock pulse $BC_{12}$ in FIG. 2(*a*), and in the main unit 1, when the CPU-I 104 has received this BGM request signal, it connects the output of the BGM source 4 instead of the terminating call ringing tone generator 107 to the drive circuit 106*a* and transmits a loudspeaker switch control signal to the requesting telephone set. In this way, at any arbitrary telephone set, one can receive the BGM merely by operating the BGM request key-switch.

In the case where it is desired to effect unlocking of a door lock with any arbitrary telephone set in response to operation of a door chime, modification can be made such that a door unlock key-switch is provided in each telephone set to transmit a door unlock signal at the pulse position subsequent to, for example, the clock pulse $BC_{13}$ in FIG. 2(*a*) when the key switch has been operated, and in the main unit 1, when the CPU-I 104 has received this door unlock signal it sends an unlock signal to an electric door lock 5 and thereby the key telephone equipment provides a door unlock control function.

In addition, a further modification can be made by providing a detector 6 for an alarm such as a fire alarm connected to the main unit 1, and when the detection output of the detector 6 has been received by the CPU-I 104, the CPU-I 104 operates an alarm signal generator (not shown) to feed the generated alarm signal to the drive circuit 106*a*, and also to transmit loudspeaker switch control signals to all the telephone sets, whereby upon occurrence of a fire or other emergency, an alarm can be produced from the loudspeakers of all the telephone sets.

While the present invention has been described above in connection with specific embodiments thereof, the invention is not limited to these embodiments but various changes and modifications can be made without departing from the scope of the invention as defined in the appended claims.

What is claimed is:

1. Telephone apparatus comprising:
   a main unit connected to an external office line and including a D.C. power supply means,
   a plurality of telephone sets each including first sound producing means, first sound receiving means, and a D.C. power supply circuit,
   a pair of office line call wires adapted for use with said first sound receiving means for an office line call,
   a pair of audio signal wires adapted for use in calling and communicating with said first sound producing means in said plurality of telephone sets,
   a pair of data wires adapted for use in time-sharing transmission of control data from said main unit to said plurality of telephone sets,
   said telephone sets being connected in parallel to said three pairs of wires,
   said pair of audio signal wires and said pair of data wires having respective neutral potential points connected in said main unit to said D.C. power supply means,
   said main unit including first drive means for said first sound producing means in said plurality of sets, said first drive means being connected to said pair of audio signal wires,
   said D.C. power supply circuit in each telephone set being connected to said neutral potential points of said audio signal and data wires,
   said main unit further including means for connecting said pair of office line call wires to the external office line,
   said neutral potential points of said audio and data signal wires being connected via an A.C. network to said first drive means in said main unit, each telephone unit further comprising switch means for switching said first sound receiving means between said office line call wires and the neutral potential points of said audio signal and data wires.

2. Telephone apparatus as claimed in claim 1 wherein said first sound producing means in each telephone set includes a loudspeaker connected to said pair of audio signal wires.

3. Telephone apparatus as claimed in claim 2 wherein said first drive means in said main unit comprises loudspeaker drive means connected to said audio signal wires.

4. Telephone apparatus as claimed in claim 1 wherein each of said telephone unit further comprises second sound producing means and second sound receiving means, said switch means switching said second sound producing means and said first sound receiving means between said office line call wires and the neutral potential points of said audio signal and data wires, and said main unit further comprises second drive means for said second sound receiving means in said plurality of sets and being connected to said pair of audio signal wires, said second drive means being connected via said A.C. network to said neutral potential points.

5. Telephone apparatus as claimed in claim 4 comprising a voice switch connecting said A.C. network to said first and second drive means.

6. Telephone apparatus as claimed in claim 5 wherein said first sound receiving means and said second sound producing means in each telephone set include a talking network including a receiver and transmitter, said switch means selectively connecting said talking network to said neutral potential points or to said pair of office line call wires.

7. Telephone apparatus as claimed in claim 6 wherein said first sound producing means and said second sound receiving means include a loudspeaker in each set which functions as a loudspeaker and a microphone.

8. Telephone apparatus as claimed in claim 7 wherein each said telephone unit further comprises a voice frequency transformer connecting said loudspeaker to said pair of audio signal wires.

9. Telephone apparatus as claimed in claim 8 comprising a data sender/receiver circuit in each telephone set, and a second transformer connecting said data sender/receiver circuit to said pair of data signal wires.

10. Telephone apparatus as claimed in claim 9 wherein the neutral potential points of said voice frequency transformer and said second transformer are connected to said D.C. power supply circuit of the respective telephone set and to said switch means.

11. Telephone apparatus as claimed in claim 1 comprising means connecting said office line call wires to office line terminals via a voice frequency transformer or directly in the case of power failure.

12. Telephone equipment adapted for connection to an external office line and an external A.C. power supply, said equipment comprising
a main unit including an office line circuit connected to the external office line, a D.C. power supply, said D.C. power supply being connected to receive power from the A.C. external power supply, control data sender/receiver means, and main control means,
a plurality of telephone sets,
a pair of office line call wires connected to said main unit for connection to the external office line by said office line circuit,
a pair of audio signal wires connected to said main unit, and
a pair of data wires connected to said control data sender/receiver means of said main unit,
said telephone sets being connected in parallel to said office line call wires, said audio signal wires and said data wires,
said main unit further including first voice-frequency transformer means for sending and receiving audio signals, said first voice frequency transformer means including a secondary winding having a center tap, first pulse transformer means connected to said data sender/receiver means and to said data wires for sending and receiving data signals, said pulse transformer means including a secondary winding having a center tap,
each telephone set including loudspeaker means, second voice frequency transformer means including a secondary winding connected to said audio signal wires, and a primary winding connected to said loudspeaker means, second pulse transformer means including a secondary winding connected to said data signal wires for receiving and sending data signals, the secondary windings of said second voice frequency transformer means and said pulse transformer means having respective center taps,
said main unit further including first high impedance means connected to said D.C. power supply and to said center taps of the secondary windings of said first voice frequency transformer means and said first pulse transformer means,
each telephone set further including a constant voltage circuit and second high impedance means connected to said center taps of the secondary windings of said second voice frequency transformer means and said second pulse transformer means and to said constant voltage circuit such that each telephone set can be supplied with electric power through said pair of audio signal wires and said pair of data wires,
said main unit further including third voice frequency transformer means connecting the center taps of the secondary windings of said first voice frequency transformer means and said first pulse transformer means to said primary winding of said first voice frequency transformer means,
each telephone set further including a talking network having receiver means and transmitting means and switch means connecting said center taps of the secondary windings of said second voice frequency transformer means and said second pulse transformer means to said talking network whereby an extension call can be completed between said telephone sets through said pair of audio signal wires and said pair of data wires.

13. Equipment as claimed in claim 12 wherein said main unit further includes a voice switch means and a loudspeaker drive means connected in series between said primary winding of said first voice frequency transformer means and said third voice frequency transformer means.

14. Equipment as claimed in claim 13 comprising call ringing tone generator means in said main unit connected to said loudspeaker drive means.

15. Equipment as claimed in claim 12 comprising means connecting said office line call wires to office line terminals via fourth voice frequency transformer means or directly in the case of power failure.

16. A method of connecting a main unit of telephone equipment to a plurality of telephone sets for connection of the telephone sets to an external office line and for extension line calling, said method comprising operatively connecting the main unit to an external office line, operatively connecting the plurality of telephone sets to the main unit in parallel via three pairs of wires constituted by a first pair of line wires, a second pair of audio signal wires and a third pair of data signal wires, and supplying electrical voltage from an external source through the main unit to each of the telephone sets via the pairs of data wires and audio wires enabling extension line calling to be completed through said pair of audio signal wires and said pair of data signal wires whereas outside calling through the external office line is effected through the the line wires and the main unit.

17. A method as claimed in claim 16 wherein each telephone set has a respective loudspeaker, the method further comprising driving said loudspeaker in a circuit powered from the external source via said pair of audio signal wires and said data signal wires.

* * * * *